Jan. 21, 1969  H. W. WESSELLS III  3,423,122
UNITIZED AUTOMOBILE BODY CONSTRUCTION
Filed Dec. 29, 1966  Sheet 1 of 3

INVENTOR.
HENRY W. WESSELLS, III
BY
ATTORNEY

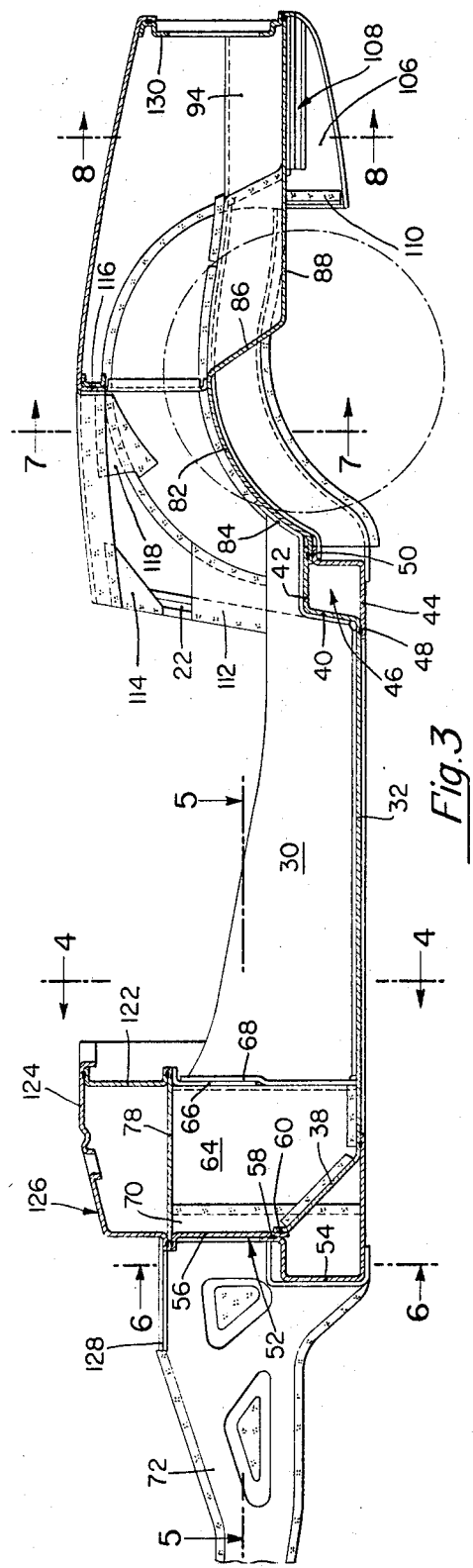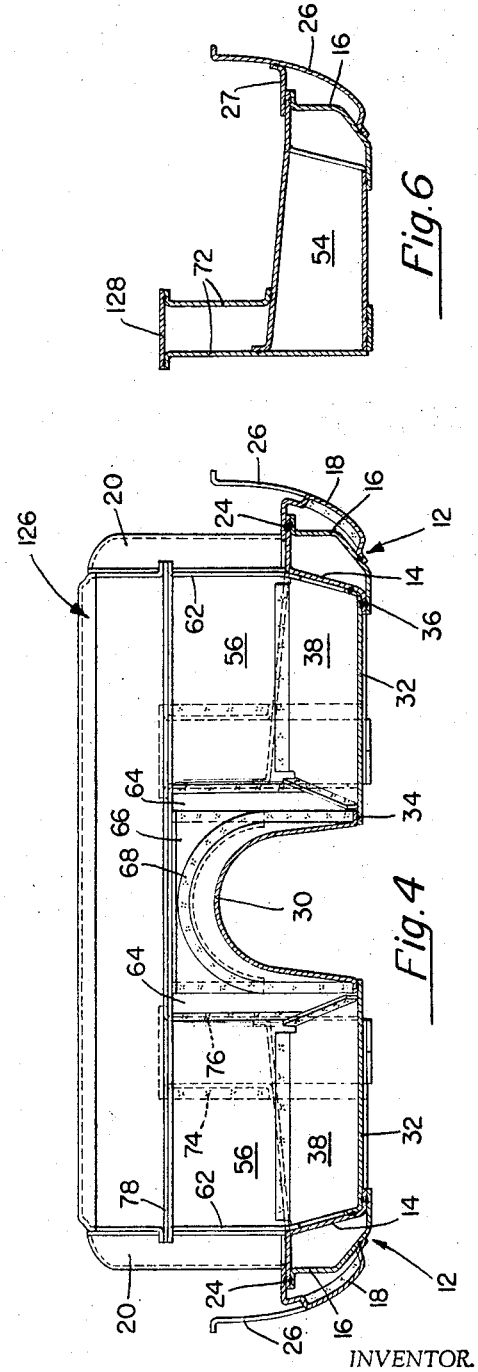

INVENTOR.
HENRY W. WESSELLS, III
BY
ATTORNEY

United States Patent Office 3,423,122
Patented Jan. 21, 1969

3,423,122
UNITIZED AUTOMOBILE BODY CONSTRUCTION
Henry W. Wessells III, Paoli, Pa., assignor to The Budd Company, Philadelphia, Pa., a corporation of Pennsylvania
Filed Dec. 29, 1966, Ser. No. 605,755
U.S. Cl. 296—28      12 Claims
Int. Cl. B62d 23/00, 21/00

ABSTRACT OF THE DISCLOSURE

A unitized vehicle body having high rigidity and strength built into the body structure below the seat supports without the use of a separate underbody frame. The body construction is simplified by the use of relatively large and shallow stampings for ease of manufacture and assembly.

---

This invention relates to a unitized automobile body construction and has for an object the provision of improvements in this art.

The invention relates particularly to a body construction for limited volume production where the superior facilities for large mass production are not available, a field in which there have often been attempts to meet the requirements with reinforced plastic bodies.

The invention will be disclosed in connection with a sports model car which has no load-carrying top or overseat superstructure and wherein it is desirable to obtain high strength and rigidity in the body below the seats at as low cost as possible without the use of a separate underbody frame.

One of the particular objects of the invention is to provide a unitized body construction which has great strength and rigidity with as little material and work as possible.

Another object is to provide such a construction in metal, such as steel or aluminum, so as to avail of known metal-working materials and methods and to avoid the more intricate methods and relatively less satisfactory materials incident to the manufacture of bodies from reinforced plastic materials.

It is not recognized that metal stampings are easier to produce than plastic components; that it is easier, less expensive, and more secure to join metal components by common welding procedures than to join plastic components by the means and procedures which they require.

Another object is to provide a body construction which permits the use of relatively large and relatively shallow stampings.

As will be explained hereinafter, the number of stampings is minimized by establishing a joint or parting line near the horizontal centerline of the body. This makes it possible to have various parts made as unit stampings extending completely across the body from one side to the other, especially in the upper body assembly.

Such a horizontal joint line in the present body design has a number of advantages in addition to that of permitting the use of larger components. It permits the entire lower body assembly below the joint line, including the lower under panels, wheelhouse panels, and related parts, to be joined and completed in an accessible manner; and permits the subsequent assembly of the upper body components to the lower body components in a convenient and expeditious manner. Specifically, the parts are provided with outwardly extending mating flanges which are openly accessible for welding together. These external flanges provide strength and side blow protection and provide strength elements for the securement and support for various parts such as decorative cover strips and other external parts.

In attaining maximum strength and rigidity with a minimum number of parts and greatest ease of manufacture and assembly of parts, the structure hereby provided, among other things, provides the following features.

Strong side stills are connected at their front ends to strong structures which include lower transverse box beam structures and vertically extending box-like post or strut structures which, after final assembly, are connected to and strengthened by a strong box-like transverse cowl deck beam structure.

Laterally wide box-like front sill structures extend back into the cowl structure and are widened vertically at their rear ends to connect the upper and lower box-like cowl structures together. A vertically deep medial longitudinal tunnel structure is connected to the laterally spaced box-like structures of the cowl and along its sides is connected to the box-section main side sill structures by front floor panel units. The floor panels at their front end have inclined kick-up toe-plate portions which form part of the lower transverse box-like beam structures.

At their rear end the main side sill structures are connected to transverse box-like beam structures which, at their inner end, are connected on the front side and top to the sides of the tunnel structure. The rear transverse box-like beam structures are formed by a raised portion at the rear end of the front floor panels and an angle-section box-closing member.

A rear floor panel is connected at its forward end to the rear transverse box-like beam structures and to the rear end of the tunnel structure. Along its sides the rear floor panel is connected to rear sill structures and to wheel housing structures, the rear sill structures at their forward end being connected to the rear transverse box-like beam structure and along their sides being connected to the wheel housing structures to form box-like rear side sill structures.

Behind the rear wheel housing the rear floor panel structure is so formed and connected to the rear quarter fender panels as to provide box-like supplemental side sill structures, thus avoiding the need to extend the rear side sill structures beyond the wheel housing region except to make suitable connections to the supplemental side sill structures.

The above and other objects of the invention, as well as various features and advantages, will be apparent from the following description of an exemplary embodiment, reference being made to the accompanying drawings, wherein:

FIG. 3 is an enlarged vertical longitudinal section taken on the line 3—3 of FIG. 1;

FIG. 4 is a vertical transverse section taken on the line 4—4 of FIG. 3;

FIG. 6 is a partial vertical transverse section taken on the line 6—6 of FIGS. 3 and 5;

Figure 1:
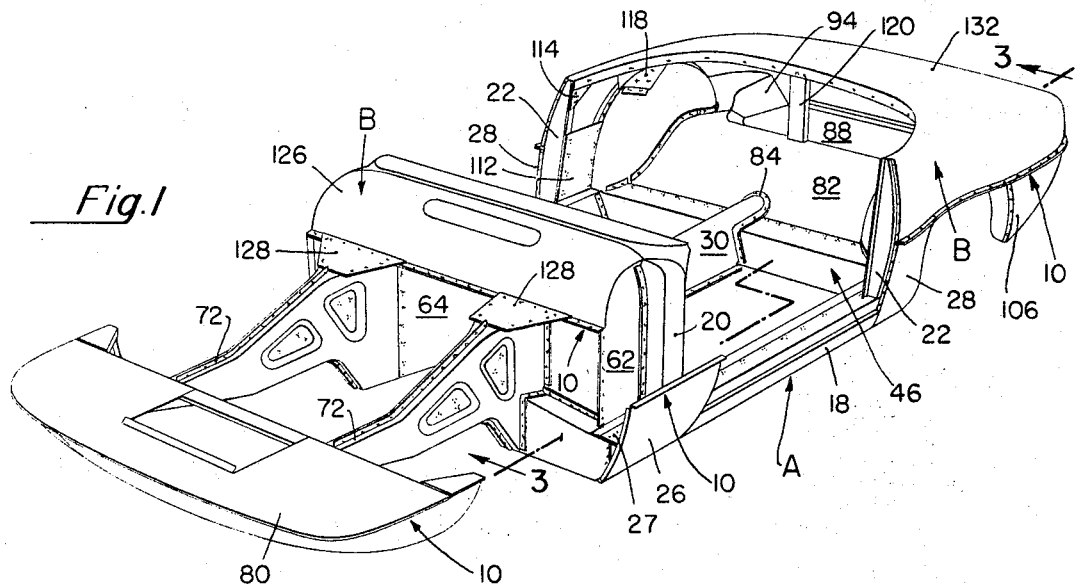
FIG. 1 is a front-top-side perspective view of a unitized body construction embodying the invention.
Figure 2:
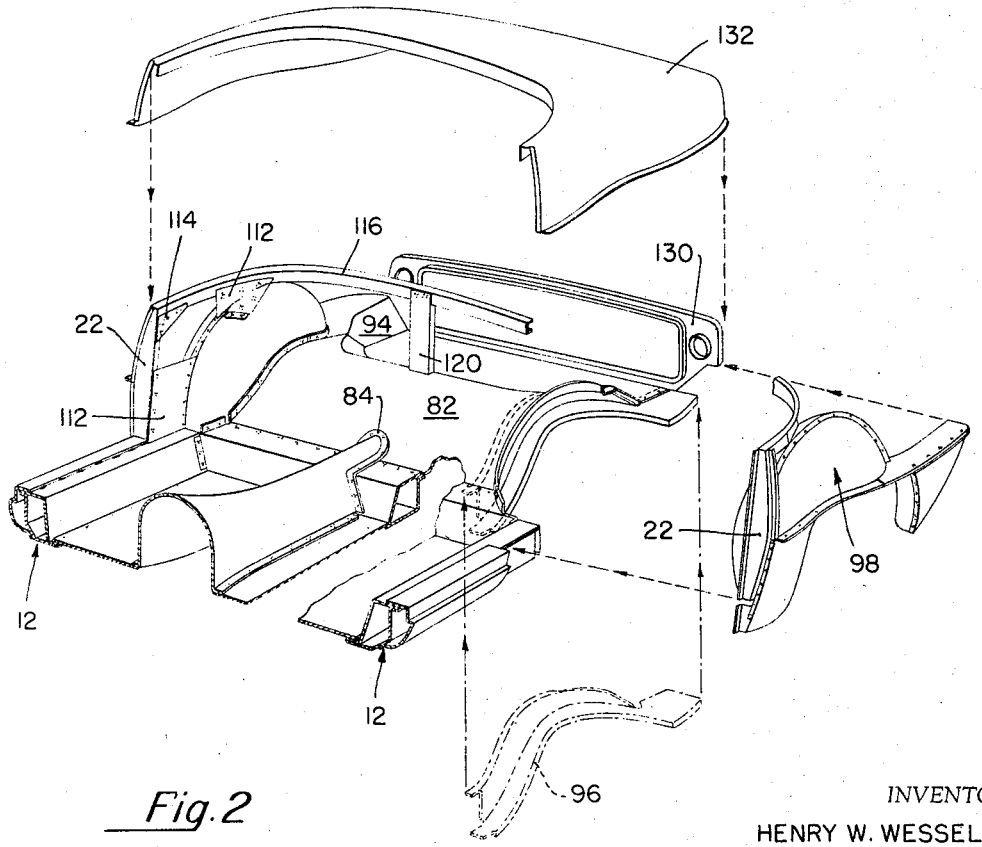
FIG. 2 is a partially exploded sectional perspective view.

In general, the body structure comprises a lower body structure or assembly A and an upper body structure or assembly B, the upper and lower body structures having a final connection joint along an outwardly flanged horizontal joint or parting line 10, some of the upper body components near the front being omitted for clarity.

The lower body structure or assembly A comprises strong box-like main side sill structures or assemblies 12, each comprising (FIG. 4) an inner bent sill member 14, an outer bent sill member 16, and an external bent protective and strengthening sleeper or rocker member 18. Between the front vertical A-posts 20 and the rear vertical B-posts 22, that is in the door and passenger space on the sides, the member 18 is bent over and connected, as in welded joint 24, to flanges of the sill members 14 and 16. At the front of the beam 12 there is secured a flanged side panel element 26, a bridge member 27 aiding the connection; and at the rear there is secured to the side sill and to the B-post 22 a flanged side panel element 28.

In addition to the main side sills, a deep medial longitudinal tunnel structure 30 provides great bending and torsional strength and rigidity.

Front floor panels 32 are connected on each side, as by welding at joints 34 and 36, to the tunnel structure 30 and to the side sills 12, respectively.

At the front end the front floor panels 32 have an upwardly inclined kick-up or toe-plate portion 38 which is flanged on the sides and front for connection to adjacent parts. At the rear end the front floor panels 32 have an upwardly extending kick-up portion 40 and a top extension 42 which cooperate with a flanged L-shaped box-closing member 44 to form a rear transverse beam structure 46, the parts being connected, as by weld joints 48 and 50.

At the front end on each side of the tunnel structure 30 there is a transverse vertical firewall or dashboard structure 52 comprised of a lower channel member 54 and an upper plate 56, the parts 54 and 56 either being made integral or made as separate parts secured together, as at a weld joint 58. The toe plate portion 38 is secured at its front flange, as at a weld joint 60, to the front fireball or dashboard 52 to form a closed box-beam structure with the member 54.

Figure 5:
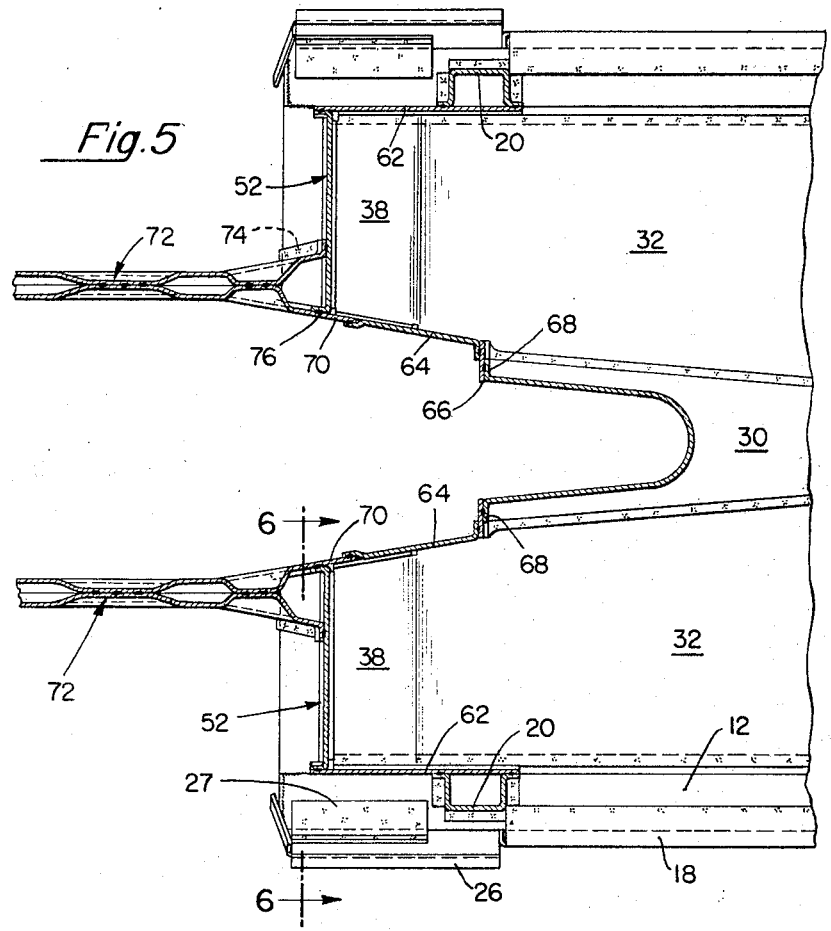
FIG. 5 is a partial horizontal section taken on the line 5—5 of FIG. 3.
Figure 7:
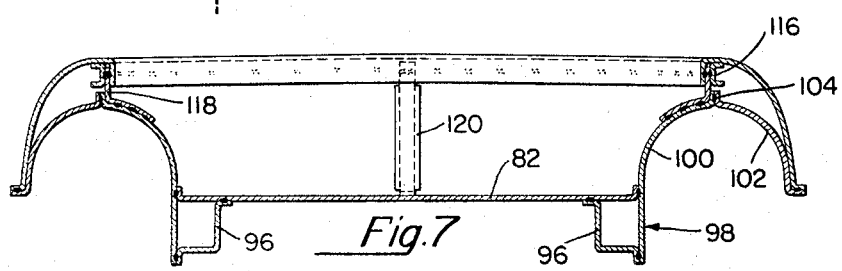
FIG. 7 is a transverse vertical section taken on the line 7—7 of FIG. 3.

As shown in FIG. 5, an outer, longitudinally wide, vertical upright strut or post plate member 62 is secured, as by suitable weld joints, to the inner side of a main side sill 12, to a side flange of the firewall 52, to the A-post 20, and to the outer side flange of the toe plate element 38.

An inner longitudinally wide vertical strut or post plate member 64 is secured, as by suitable weld joints, to a transverse cut-out medial filler plate 66 to which the front end flanges 68 of the tunnel structure 30 are connected, to the inner flanges of the toe plate 38, and to the inner vertical longitudinal plate ends 70 of front sill structures 72 which are rigidly secured, as by flanged weld joints 74 and 76, to the front firewall structure 52.

The firewall element 56, together with the outer plate post member 62, the inner post plate member, and the beam structure 38, 54, form a rearwardly open post or strut cowl box on each side of the tunnel. These vertical box strut structures are closed at the top and connected across the center line by a through-running transverse horizontal lower front deck beam plate 78 secured, as by weld joints, to outwardly extending flanges of the firewall members 56, to the filled plate 66, and to the side post plates 62 and 64. The plate 78 further rigidifies and strengthens the open vertical side cowl box-like strut or post structures and, as will be explained later, it also forms part of a cowl deck box structure after the upper body assembly has been installed.

The vertically wide rear ends of the front beams 72 extend the full height of the front fire wall and greatly strengthen and rigidify it. Each front end sill is formed of laterally spaced plates and connections to form a box structure. At the front end they carry a lower body assembly 80 which need not be detailed herein except to note that it also has a horizontal joint line 10.

A rear floor panel 82 is connected at its front end, as in the joint 50, to the rear box beam 46 and has the rear end flanges 84 of the tunnel structure 30 connected to it, as by weld joints.

Figure 8:
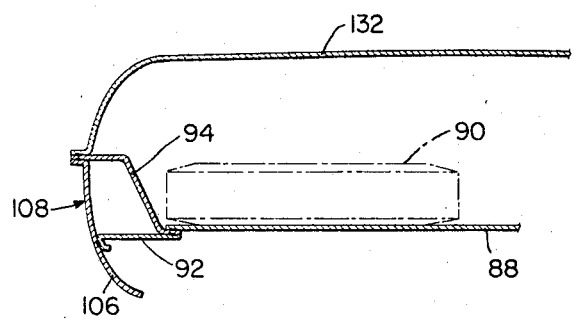
FIG. 8 is a partial vertical transverse section taken on the line 8—8 of FIG. 3.

The rear floor panel rises toward the rear to form a bridging portion in the rear wheel zone and therebehind has a horizontally arcuate medial kick-down or depressed portion 86 and a lower deck portion 88 adapted to hold a spare tire 90 (FIG. 8). The rear floor panel is widened adjacent its rear end and, in order to save material, the rear end of the floor panel 82 is provided with lower side filler members 92 and bent upper side filler members 94 forming the side extensions and a filler at the rear of the floor panel.

In the bridging portion the rear floor panel is reinforced on the sides by flanged L-shaped rear sill members 96, the side sill members being secured to the rear floor panel, as by weld joints, and both the rear floor panel and the rear side sill members being flanged and secured, as by weld joints, to the inner side of a rear wheel housing 98. There is thus formed a strong, rigid, box-like rear side sill structure on each side of the rear floor panel.

At its front end the L-shaped member 96 is suitably connected, as by weld joints, to the rear transverse beam 46.

The wheel housing 98 comprises an inner wheel housing member 100 and an outer wheel housing member 102, these being secured together, as at a medial vertical flanged weld joint 104, and the outer member 102 having a flange at the horizontal parting line 10. By thus making the wheel housing of separate parts, each may be a shallow stamping which is easily made.

Rearwardly of the wheel housing zone there is provided a lower rear fender quarter panel structure 106 which is secured, as by flanged weld joints (FIG. 8), to the filler members 92 and 94 of the rear floor panel to form, in effect, rear side sill extensions 108, thus permitting the side sills proper to be made relatively short. At the front end the rear panels 106 are stiffened by a vertical strut member 110 welded thereto.

Gusset plates 112 connect the B-posts 22 to the medial joint flanges of the wheel housing 98. Upper gusset plates 114 are secured to the B-posts 22 for the support of a channel-shaped circumferential rear deck supporting rail 116. Bent gusset plates 118 are secured medially to the wheel housings to support the rail 116. One or more post gussets 120 are secured to the rear floor panel to support the rail 116.

The upper body structure or assembly at the front comprises a through-running transverse dash plate 122 which is secured, as by weld joints, to the lower cowl deck plate 78. An open-front closed-end L-section cowl deck plate structure 124 forms, with the dash plate 122 and the lower cowl deck plate 78, a closed box-like through-running transverse cowl deck beam 126 which connects the vertical cowl box strut structures together to serve as a continuation of the tunnel formation and the strong side rigidifying strut and beam structure at the front.

The tops of the front side sill structures are connected to the front of the cowl deck beam 126 by gusset plates 128 welded to the top of the front side sills and to the flanges of beam 124 and the plate 78.

At the rear a through-running transverse vertical rear end panel 130, having a suitable opening for access and for mounting a closure (not shown) is secured to the rear floor panel 82 and to the rear deck panel 132.

A unitary rear deck panel structure 132 is secured, as by flanged weld joints, to the top of the rear end panel 130, to the rail 116, and to the out-turned side flanges of the panel of the wheel housing 98 and of the rear fender quarter panel 106. The front side edges of the deck panel are secured, as by flange weld joints, to the B-posts 22.

The lower cowl deck plate 78 and the rear end panel 130 may be considered either as part of the lower body assembly A, as described above, or as part of the upper body assembly B, depending on which assembly it is more convenient to connect them to first.

The main side sills may be cut off square at their ends and these ends secured to the transverse beam structures at front and rear in any convenient manner, as by weld joints. When so made, the three elements of the side sill sections may be used either on the right or left side, thus minimizing the number of stampings required. The front panels 26, the wheel housing parts, and the floor panels between tunnel and side rail are likewise the same for right and left.

From consideration of the above description of parts and connections, it should be obvious how the construction provides for convenient assembly and, particularly how the large unit stampings are made possible, especially in the upper body assembly and how they can readily be assembled and connected.

The construction provides wide distribution of loads into the cowl structure, permitting the use of light gage metal because of absence of high stress concentrations.

The construction also provides wide distribution of loads at the rear from the rear side sills, which carry the rear wheel mountings, into the major strength members of the body assembly.

It also provides for the use of shallow stampings which are easily formed and free from overstressed zones.

It also provides for the use of large unitary stampings, particularly in the upper body assembly.

It also provides considerable interchangeability as between right and left hand parts, thus reducing the number of parts which have to be made and stocked and simplifying tooling.

It also provides for easy assembly, particularly on account of having a horizontal final joint or parting line between the lower and upper body assemblies.

The external horizontal parting line flanges add side strength, provide for mounting decorative cover strips, and also provide a convenient anchorage for various other elements.

The construction is very light, of low cost, and more rigid and durable and less subject to cracking or breakage than reinforced plastic (commonly fiberglass and plastic) structures.

While one embodiment of the invention has been disclosed for purposes of illustration, it is to be understood that there may be various embodiments and modifications within the general scope of the invention.

What is claimed is:

1. A unitized automobile body construction, comprising in combination: main side sills, a medial longitudinal tunnel between said side sills, a pair of front floor panels each connected between said tunnel and a main side sill, said floor panels having a turned-up toe plate at the front, and a turned-up offset rear kickup, transverse channel-shaped front firewall structures connected to said floor panels and said side sills at said toe plate forming front transverse closed box members connected to and extending between said side sills and said tunnel, and rear transverse angle-shaped box-section beams connected to said floor panels and said side sills at said rear kickup forming rear transverse closed box members between said side sills and said tunnel.

2. A unitized automobile body construction as set forth in claim 1, wherein there is further provided: a transverse through-running cowl beam, outer vertical plate post members connected to said cowl beam and to said floor panels, said toe plate and said side sills forming an open box therewith, inner vertical plate post members connected to said cowl and to said floor panels, said toe plates and said tunnel.

3. A unitized automobile body construction as set forth in claim 2, wherein said cowl beam comprises: an angle-shaped cowl deck beam, a vertical dash plate connected to said cowl deck beam, and a lower front deck beam plate connected to said cowl deck and said dash plate and forming a closed box beam therewith.

4. A unitized automobile body construction as set forth in claim 2, wherein there is further provided: a pair of front sills, each comprising interconnected vertical plates, said sills being connected to the firewall structures and to said inner vertical plate post members.

5. A unitized automobile body construction as set forth in claim 1, wherein there is further provided: a rear floor panel connected to said front floor panel at said rear transverse closed box members, rear B-posts connected to said side sills, and rear wheel housings connected directly to said rear floor panel and by gussets to said B-posts.

6. A unitized automobile body construction as set forth in claim 5, wherein there is further provided: angle-shaped rear sills connected to said rear panel and said wheel housings forming longitudinal closed beams therewith.

7. A unitized automobile body construction as set forth in claim 5, wherein there is further provided: a rear deck panel connected directly to said wheel housings and said B-posts, and indirectly to said rear floor panel to form a rigid open box structure therewith.

8. A unitized automobile body construction as set forth in claim 7, wherein there is further provided: a deck-supporting rail supported by said B-posts, said wheel housings and said rear floor panel, and a rear end panel supported by said floor panel, said rail and said end panel forming a reinforcement support for said rear deck panel.

9. A unitized automobile body construction as set forth in claim 7, wherein said rear deck panel, said wheel housings and said rear floor panel are further provided with horizontal flanges occurring in a mutual vertical plane at a parting line approximately midway the height of the body construction, whereby said horizontal flanges provide accessible means for interconnection of the body.

10. A unitized automobile body construction as set forth in claim 9, wherein there is further provided: lower rear fender quarter panels connected to said horizontal flanges, and rear side panels connected to said horizontal flanges, said B-posts and said side sills.

11. A unitized automobile body construction, comprising in combination: main side sills, a medial longitudinal tunnel between said side sills, a pair of front floor panels each connected between said tunnel and a main side sill, said floor panels having a turned-up toe plate at the front, and a turned-up offset rear kickup, transverse channel-shaped front firewall structures connected to said floor panels and said side sills at said toe plate forming front transverse closed box members between said side sills and said tunnel, a transverse through-running cowl beam, outer vertical plate post members connected to said cowl beam and to said floor panels, said toe plate and said side sills forming an open box therewith, inner vertical plate post members connected to said cowl and to said floor panels, said toe plates and said tunnel; channel-shaped front A-posts extending from the top of said side sills to said cowl beam, said A-posts being connected to said side sills, said outer vertical plate post members and said cowl beam; and rear transverse angle-shaped box-section beams connected to said floor panels and said side sills at said rear kickup forming rear transverse closed box members between said side sills and said tunnel.

12. A unitized automobile body construction as set forth in claim 11, wherein there is further provided: a rear floor panel, rear B-posts, rear wheel housings, rear sills, a rear end panel and a rear deck panel interconnected therewith to form a rigid open box structure rearward of said side sills and said rear transverse closed box member.

References Cited

UNITED STATES PATENTS

| | | | |
|---|---|---|---|
| 2,226,790 | 12/1940 | Valletta | 296—28 |
| 2,627,437 | 2/1953 | Toncray et al. | 296—28 |
| 2,637,592 | 5/1953 | Karlby | 296—28 |
| 3,108,836 | 10/1963 | Deckert | 296—28 |
| 3,279,816 | 10/1966 | Issigonis | 296—28 |

FOREIGN PATENTS

| | | |
|---|---|---|
| 870,108 | 12/1941 | France. |
| 728,111 | 11/1942 | Germany. |
| 805,577 | 12/1958 | Great Britain. |

LEO FRIAGLIA, *Primary Examiner.*

J. A. PEKAR, *Assistant Examiner.*

U.S. Cl. X.R.

280—106